(12) United States Patent
Kusunoki

(10) Patent No.: US 11,245,447 B2
(45) Date of Patent: *Feb. 8, 2022

(54) MIMO COMMUNICATION METHOD, AND BASE STATION APPARATUS AND TERMINAL

(71) Applicant: Sony Corporation, Tokyo (JP)

(72) Inventor: Shigeo Kusunoki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 149 days.

This patent is subject to a terminal disclaimer.

(21) Appl. No.: 16/695,255

(22) Filed: Nov. 26, 2019

(65) Prior Publication Data

US 2020/0099424 A1 Mar. 26, 2020

Related U.S. Application Data

(63) Continuation of application No. 15/992,816, filed on May 30, 2018, now Pat. No. 10,547,360, which is a (Continued)

(51) Int. Cl.
*H04L 5/00* (2006.01)
*H04B 7/0456* (2017.01)
(Continued)

(52) U.S. Cl.
CPC ......... *H04B 7/0456* (2013.01); *H04B 7/0452* (2013.01); *H04J 11/003* (2013.01);
(Continued)

(58) Field of Classification Search
CPC ...... H04B 7/0452; H04B 7/0456; H04B 7/04; H04J 11/003; H04L 27/2634; H04L 5/0007; H04L 5/0026; H04L 5/00
See application file for complete search history.

(56) References Cited

U.S. PATENT DOCUMENTS

2002/0171568 A1* 11/2002 Yang .................. H04J 13/12
341/96
2004/0252629 A1 12/2004 Hasegawa et al.
(Continued)

OTHER PUBLICATIONS

"Group Transmission in Downlink of Overloads CDMA Systems", Personal, Indoor and Mobile Radio Communications, 2006 IEEE 17th Inter National Symposium on, IEEE, Sep. 1, 2006 (Sep. 1, 2006).*
Extended European Search Report dated Nov. 2, 2015 in Patent Application No. 15170098.6.
S. Mohammad Razavizadeh, et al. "Group Transmission in Downlink of Overloaded CDMA Systems" The 17th Annual IEEE International Symposium on Personal, Indoor and Mobile Radio Communications, XP031023585, Sep. 1, 2006, 5 Pages.
(Continued)

*Primary Examiner* — Abdelillah Elmejjarmi
(74) *Attorney, Agent, or Firm* — Xsensus LLP

(57) ABSTRACT

A MIMO communication method for performing MIMO communication between a base station including a plurality of antennas, and a plurality of terminals accommodated in the base station. The method includes, in the base station, dividing the plurality of terminals into a first and a second group, and assigning orthogonal codes with each other to the respective groups, spreading transmission data to the plurality of terminals with the assigned codes, multiplying data obtained by the spreading by a predetermined pre-coding matrix, obtaining a channel matrix representing channels between the plurality of antennas and the plurality of terminals, multiplying data obtained by the multiplying by the pre-coding matrix by a complex conjugate matrix of the channel matrix, and transmitting data obtained by the multiplying by the complex conjugate matrix from the plurality of antennas.

12 Claims, 11 Drawing Sheets

Related U.S. Application Data continuation of application No. 14/714,566, filed on May 18, 2015, now Pat. No. 10,003,389.

(60) Provisional application No. 62/007,656, filed on Jun. 4, 2014.

(51) Int. Cl.
*H04B 7/0452* (2017.01)
*H04J 11/00* (2006.01)
*H04L 27/26* (2006.01)

(52) U.S. Cl.
CPC .......... *H04L 5/0007* (2013.01); *H04L 5/0026* (2013.01); *H04L 27/2634* (2013.01)

(56) References Cited

U.S. PATENT DOCUMENTS

| | | | |
|---|---|---|---|
| 2012/0099636 A1 | 4/2012 | Ki et al. | |
| 2012/0300863 A1 | 11/2012 | Nogami et al. | |
| 2013/0201896 A1* | 8/2013 | Ono | H04B 17/382 370/312 |
| 2014/0126611 A1* | 5/2014 | Bang | H04B 1/7097 375/140 |
| 2015/0009921 A1* | 1/2015 | Papadopoulos | H04L 5/006 370/329 |

OTHER PUBLICATIONS

Lin Yang, et al., "Linear Selective Channel Inversion Technique for Multi-user MIMO systems" Vehicular Technology Conference Fall (VTC 2010—Fall), XP031770090, Sep. 6, 2010, 5 Pages.

Ha H. Nguyen, "Improving the Capacity of Synchronous CDMA Systems with Group-Orthogonal Signature Waveforms" IEICE Transactions on Communications, vol. E87-B, No. 1, XP001541234, Jan. 1, 2004, pp. 68-78.

Marzella, "Non cooperative Cellular Wireless with Unlimited Numbers of Base Station Antennas," IEE Transactions on Wireless Communications, vol. 9, No. 11, Nov. 2012; pp. 3590-3600.

Rusek et al., "Scaling Up Mimo," IEEE Signal Processing Magazine, Jan. 2013, pp. 40-60.

Extended European Search Report dated May 20, 2020, issued in corresponding European Patent Application No. 20156868.0.

Okawa Ket al: "Orthogonal multi-spreading factor forward link for coherent OS-CDMA mobile radio", 1997 IEEE 6th. International Conference on Universal Personal Communications Record. San Diego, Oct. 12-16, 1997; [IEEE International Conference on Universal Personal Communications], New York, IEEE, US, vol. 2, Oct. 12, 1997 (Oct. 12, 1997), pp. 618-622, XP010248782, DOI: 10.1109/CUPC.1997.627238 ISBN: 978-0-7803-3777-0.

* cited by examiner

FIG. 4
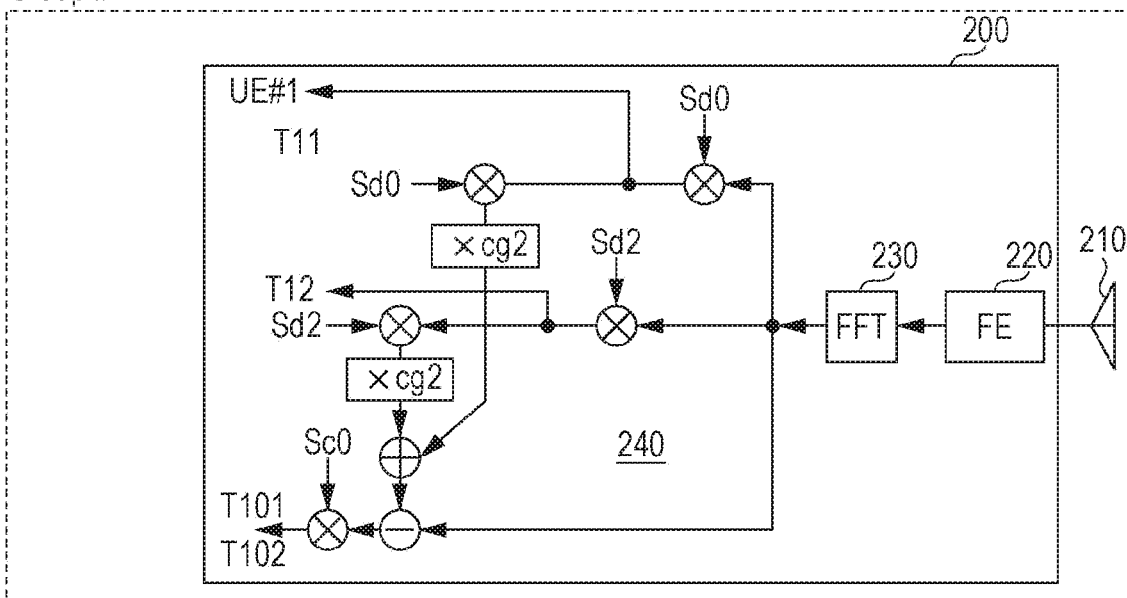
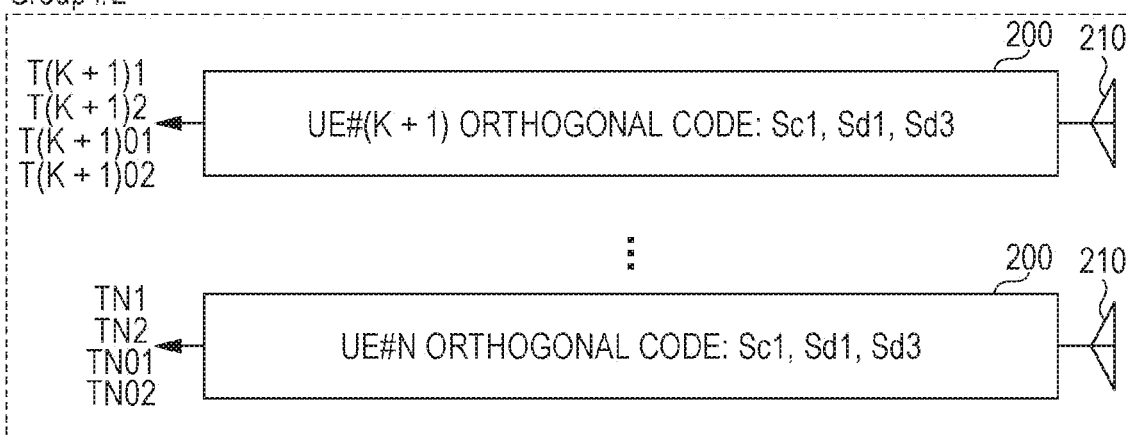

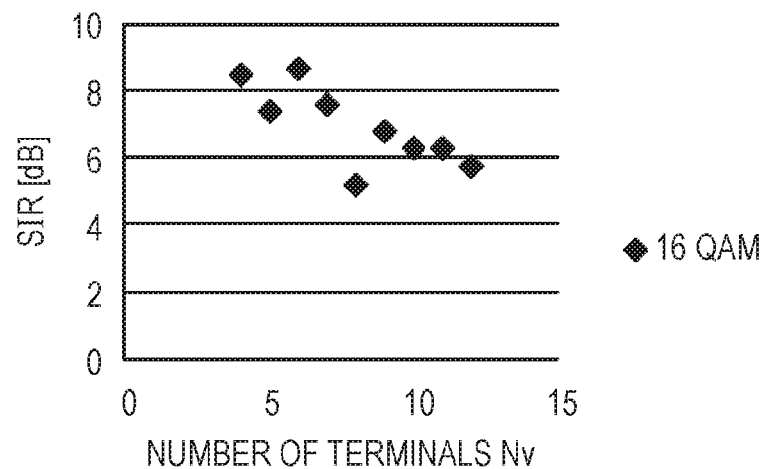
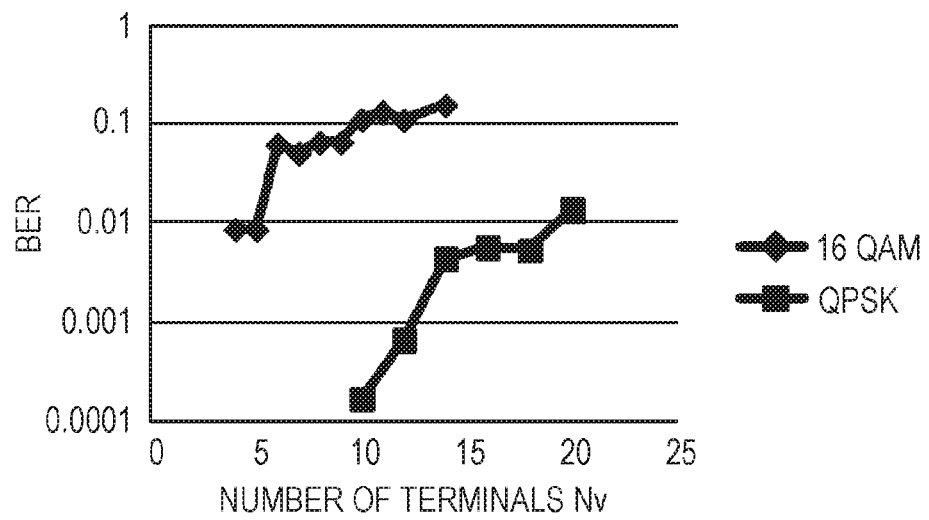

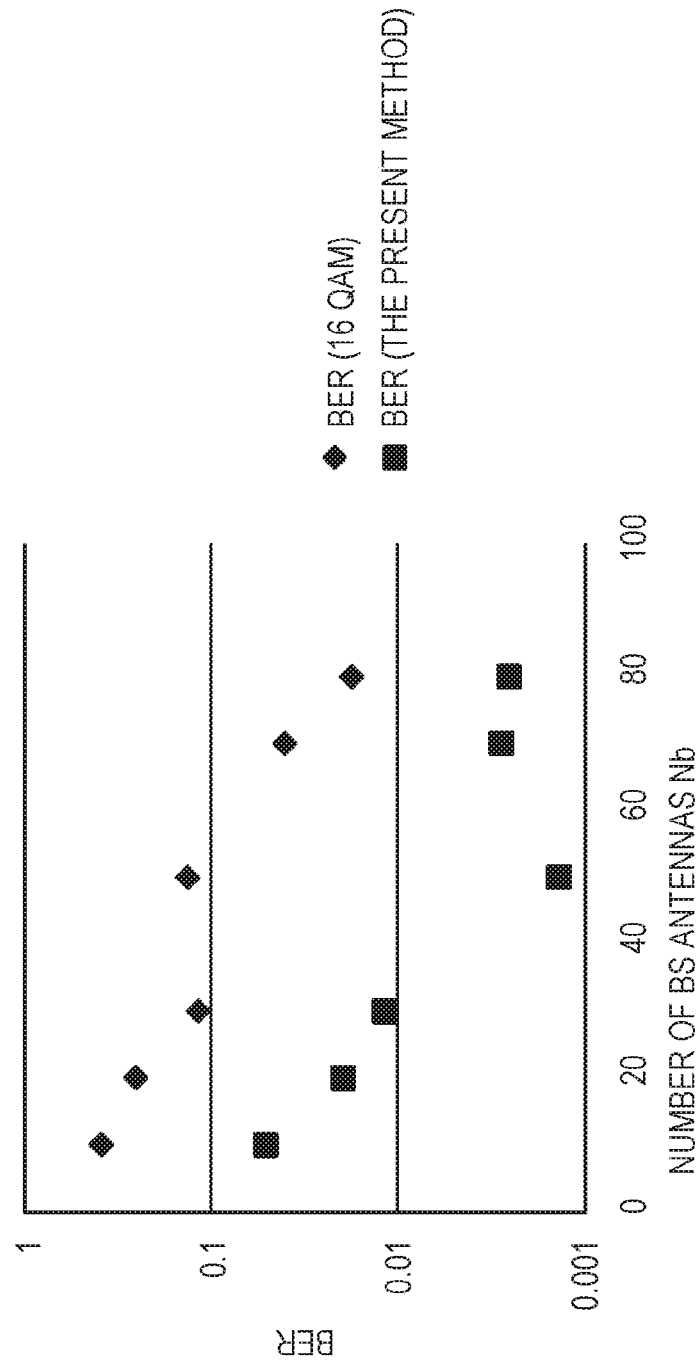

FIG. 9

$$G = H \cdot H^* \cdot Tx$$

$$= \begin{bmatrix} h00 & h01 \\ h10 & h11 \end{bmatrix} \begin{bmatrix} h00^* & h10^* \\ h01^* & h11^* \end{bmatrix} \begin{bmatrix} Tx \end{bmatrix}$$

$$= \begin{bmatrix} \Sigma hij^2 & \Sigma hij \cdot hkl^* & \Sigma hij \cdot hkl^* \\ \Sigma hij \cdot hkl^* & \Sigma hij^2 & \Sigma hij \cdot hkl^* \end{bmatrix} \begin{bmatrix} Tx \end{bmatrix}$$

RECEPTION SIGNAL OF UE#1

$$= \begin{bmatrix} Tx0 \cdot \Sigma hij^2 + Tx1 \cdot \Sigma hij \cdot hkl^* & ----- \\ Tx1 \cdot \Sigma hij \cdot hkl^* + Tx1 \cdot \Sigma hij^2 & ---- \\ \vdots & \end{bmatrix}$$

FIG. 11
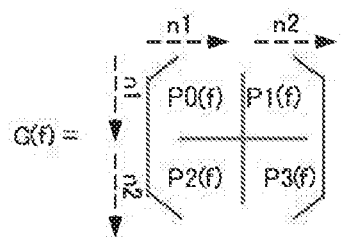
FIG. 12
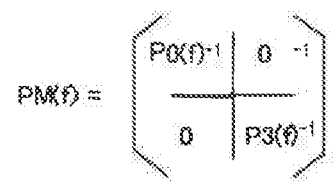
FIG. 13

MIMO COMMUNICATION METHOD, AND BASE STATION APPARATUS AND TERMINAL

CROSS REFERENCE TO RELATED APPLICATIONS

The present application is a continuation application of U.S. patent application Ser. No. 15/992,816, filed May 30, 2018, which is a continuation application of U.S. patent application Ser. No. 14/714,566, filed May 18, 2015 (now U.S. Pat. No. 10,003,389), which is based upon and claims priority under 35 U.S.C. § 119(e) to related Provisional Application Ser. No. 62/007,656, filed Jun. 4, 2014, the contents of each are hereby incorporated herein by reference.

BACKGROUND

1. Field

The present disclosure relates to a MIMO (Multiple-Input, Multiple-Output) communication method as communication having multiple inputs and multiple outputs, and in particular, to a so-called massive MIMO communication method using a large number of transmission antennas.

2. Description of the Related Art

Currently, the amount of wireless communication by portable terminals is explosively increasing with the spread of smart phones. In the future, it is assumed that communications among devices without human intervention are on the rise, and it is expected that the amount of traffic will increase to as much as a thousand times to ten thousand times the current amount in and after 2020. Accordingly, researches are actively carried out in new communication methods. That is to say, in addition to LTE (Long Term Evolution) that has currently come into commercial use, and LTE-A, researches are being made in methods having higher efficiency in frequency usage, and proposals are about to be made as the fifth generation methods of 3GPP.

As one of powerful techniques among them, massive MIMO (massive MIMO) is provided.

As illustrated in FIG. 8, a base station BS has a large number (Nb pieces) of transmission antennas (Ant #1 to Ant #Nb), and a communication system that performs communication with a plurality of (the number N of) terminals (UE #1 to UE #N) through channels h00 to h0(Nb−1), . . . , h(Nb−1)0 to h(Nb−1)(N−1) at the same time is constituted. The number Nb of transmission antennas of the base station BS is, for example about 100 pieces, and the number of mobile terminals is, for example about 10 units.

With such a construction, although the frequency use efficiency has been affected by influences of channel noise and fading that changes rapidly so far, it is possible to keep the frequency use efficiency stable without being practically affected by those influences. Also, the channel capacity dramatically increases compared with related-art MIMO. For this reason, massive MIMO is the most dominant technique as the next generation new technique.

In this regard, concerning SU-MIMO (Single User-MIMO) and MU-MIMO (MultiUser-MIMO) as multiple-input and multiple-output communication, a proposal of a disclosure is made in a prior application U.S. Ser. No. 14/178,898 (PJ13 0917US1) by the present applicant. In this proposal, code multiplexing with different amplitudes is applied to an orthogonal frequency division multiplexing (OFDM: Orthogonal Frequency Division Multiplexing) method so that it makes possible to reduce N pieces of reception antennas that are necessary for related-art (N×N) MIMO to one piece. Thereby, it becomes possible to perform MIMO high-speed communication without increasing the number of antennas of a terminal.

A massive MIMO method was introduced in about 2010 by academic papers, and research results aimed for practical applications were eagerly released in the middle of 2013. The details are described, for example, in Non Patent Literature 1, 2. By this, in the case where the number of terminals is Nv, and the number of antennas of the base station BS is Nb, the channel matrix H becomes Nv×Nb. Here, at the time of transmission from the BS (downlink, DL), when multiplying the channel matrix H by its complex conjugate transpose H* ("*" represents complex conjugate transpose), the reception data of each terminal becomes H·H*· (transmission data). H·H* is a matrix called a correlation matrix G.

Here, non-diagonal elements of the correlation matrix G (that is to say, H·H*) become smaller compared with diagonal elements if the correlation between different channels is low. Using this correlation matrix G, it is possible for a terminal to receive a signal for the own terminal without performing operation, such as diagonalization, or the like as a result. Also, noise superimposed on a channel is reduced by the correlation matrix G, because auto- and cross-correlation of the noise itself is low. As a result, it becomes possible to perform reception that is less subject to the influence of SN.

CITATION LIST

Non Patent Literature

[NPL 1] Thomas L. Marzetta, "Noncooperative Cellular Wireless with Unlimited Numbers of Base Station Antennas", IEEE TRANSACTIONS ON WIRELESS COMMUNICATIONS, VOL. 9, NO. 11, NOVEMBER 2010, pp. 3590-3600

[NPL 2] Fredrik Rusek, Daniel Persson, Buon Kiong Lau, Erik G. Larsson, Thomas L. Marzetta, Ove Edfors, and Fredrik Tufvesson, "Scaling up MIMO", IEEE SIGNAL PROCESSING MAGAZINE, January 2013, pp. 40-60.

However, in reality, the non-diagonal elements of the correlation matrix G=H·H* do not become completely zero. This state is indicated by the (1) expression illustrated in FIG. 9.

When channels are uncorrelated, it is expected that the non-diagonal elements in the (1) expression become small by the sum total of uncorrelated values with each other. That is to say, if a terminal is denoted by UE, the first term is a signal to be received by UE #1 in the part of "the reception signal of UE #1" in the (1) expression. The second term, and after that indicate that signals to be received by the other UEs are mixed as interference. Here, in the case of low correlation, it is expected that the addition result of the second term and after that is very small compared with the first term. However, the correlation value indicates a finite value, and an interference term of a certain terminal is the sum of the values for the number of the other terminals. Accordingly, the amount of interference increases as the number of terminals increases. The interference contaminates the quality of the reception signal as a result. In order to avoid this, it is necessary to further increase the number of antennas disposed in the BS. By increasing the number of antennas, it is possible to make the sum total of the correlation values smaller.

A description will be given of these actual influences using FIG. 5A and FIG. 5B.

FIG. 5A is a graph illustrating a relationship of interference SIR (Signal to Interference Ratio) with respect to the number of terminals Nv when the number of antennas of the BS is 100 pieces. FIG. 5A illustrates the case where the signal modulation is 16QAM. From this graph, in order to reduce interference, and to make SIR equal to or higher than 10 dB, it is necessary to set the number of terminals to four units or less.

FIG. 5B is a graph illustrating a relationship of a reception bit error (BER) with respect to the number of terminals Nv. FIG. 5B illustrates the case where the signal modulation is QPSK, and 16QAM. As is understood from this graph, in the case of QPSK, it is possible to keep BER<$10^{-2}$ if the number of terminals is up to about 20 units. The BER of $10^{-2}$ or less is a value that keeps the quality of voice communication of a current 3G mobile phone, and becomes a target of the quality. On the other hand, in the case of 16QAM, if there are four terminals or more, it is difficult to meet this quality. That is to say, if the number of terminals is up to three, it is possible to perform communication with 16QAM, but if there are four terminals or more, it is not possible to perform this communication any more. In the case of data communication, permissible BER< about $10^{-3}$, and thus the number of terminals becomes 12 with QPSK, and four with 16QAM.

In this manner, in reality, the number of terminals accommodated in one base station is limited to a few units, and if the number increases, there arises a problem in that only lower-speed communication services are allowed to be provided.

The inventor recognizes the necessity of relaxing the restriction on the number of terminals allowed to be accommodated in one base station without lowering the communication speed.

BRIEF SUMMARY

In the present disclosure, a MIMO communication method according to the present disclosure introduces orthogonalization using spreading with orthogonal codes when MIMO communication is performed between a base station including a plurality of antennas, and a plurality of terminals accommodated in the base station.

That is to say, terminals accommodated in one base station are divided into at least the first and the second group, and orthogonal codes are assigned to the respective groups. In a group, multiplexing is performed by a non-orthogonal code. After this, a transmission signal is multiplied by a new matrix using the inverse matrix of a block matrix of only a part corresponding to the relevant group of the channel correlation matrix as a pre-coding matrix. The signal obtained in this manner is used as a transmission signal to be supplied to a plurality of antennas. At a reception side, inverse spreading is repeated using an orthogonal code assigned to the own terminal so that it is possible to receive a signal without interference.

More specifically, the base station, divides the plurality of terminals into a first and a second group, and assigns orthogonal codes with each other to the respective groups, spreads transmission data to the plurality of terminals with the assigned codes, multiplies data obtained by the spreading by a predetermined pre-coding matrix, obtains a channel matrix representing channels between the plurality of antennas and the plurality of terminals, multiplies data obtained by the multiplying by the pre-coding matrix by a complex conjugate matrix of the channel matrix, and transmits data obtained by the multiplying by the complex conjugate matrix from the plurality of antennas.

Also, each of the plurality of terminals, receives signals transmitted from the plurality of antennas of the base station, and inversely spreads the received signals using an orthogonal code assigned to the own terminal so as to decode transmission data to the own terminal.

For example, when a square matrix having the number of terminals in each group as an order is set to a submatrix in a diagonal part of the auto-correlation matrix of the channel matrix, the pre-coding matrix is a block diagonal matrix including the inverse matrix of the submatrix as the diagonal parts, and the non-diagonal parts set to zero.

The signals to the terminals in the second group are spread with codes which are orthogonal each other to the signals to the terminals in the first group, and thus in a matrix obtained by multiplying the correlation matrix by the pre-coding matrix, the non-diagonal block elements become zero by inverse spreading, and thus it is possible to suppress the interference.

Also, the signals to a plurality of terminals in the first group are separated with one another by an identity matrix I which is sub-diagonalized in the matrix obtained by multiplying the correlation matrix by the pre-coding matrix so that interference is not brought about.

In the present disclosure, data is spread with codes, and thus the data speed is decreased to one divided by the spread length by the spread processing. Also, the types of the orthogonal codes are limited, and thus it is necessary to use the codes repeatedly. As a result, interference arises among the non-orthogonal codes, and thus it is not possible to sufficiently reduce the interference terms. In order to handle these problems, each terminal is capable of performing non-orthogonal multiplexing of the transmission data. Also, the modulation method of the data to be spread is adjusted so that it is possible to perform communication of a larger amount of data per unit time.

With the method of the present disclosure, the restriction of the number of terminals allowed to be accommodated is relaxed, and thus it is possible to apply high-order modulation, such as 16QAM, and it is possible to obtain advantages of diagonalization by auto-correlation, and noise reduction, which are characteristics of the massive MIMO, and to achieve an increase in the channel capacity.

BRIEF DESCRIPTION OF THE DRAWINGS

FIG. 3 is a diagram illustrating operation of pre-coding matrix and after that.

FIG. 4 is a block diagram of a terminal.

FIG. 5A is a graph illustrating an increase in interference SIR by the number of terminals in the case where the number of BS antennas is 100.

FIG. 5B is a graph illustrating a reception bit error (BER) by the number of terminals.

FIG. 6 is a graph illustrating a BER characteristic when noise is added with respect to the number of antennas of a base station.

FIG. 9 illustrates a (1) expression of correlation matrix G.

FIG. 11 illustrates a (5) expression of a correlation matrix G.

FIG. 12 illustrates a (6) expression of a precoding matrix PM.

FIG. 13 illustrates a (8) expression of a format of received signals Rx.

DETAILED DESCRIPTION

In the following, a detailed description will be given of embodiments of the present disclosure with reference to the drawings.

Figure 1:
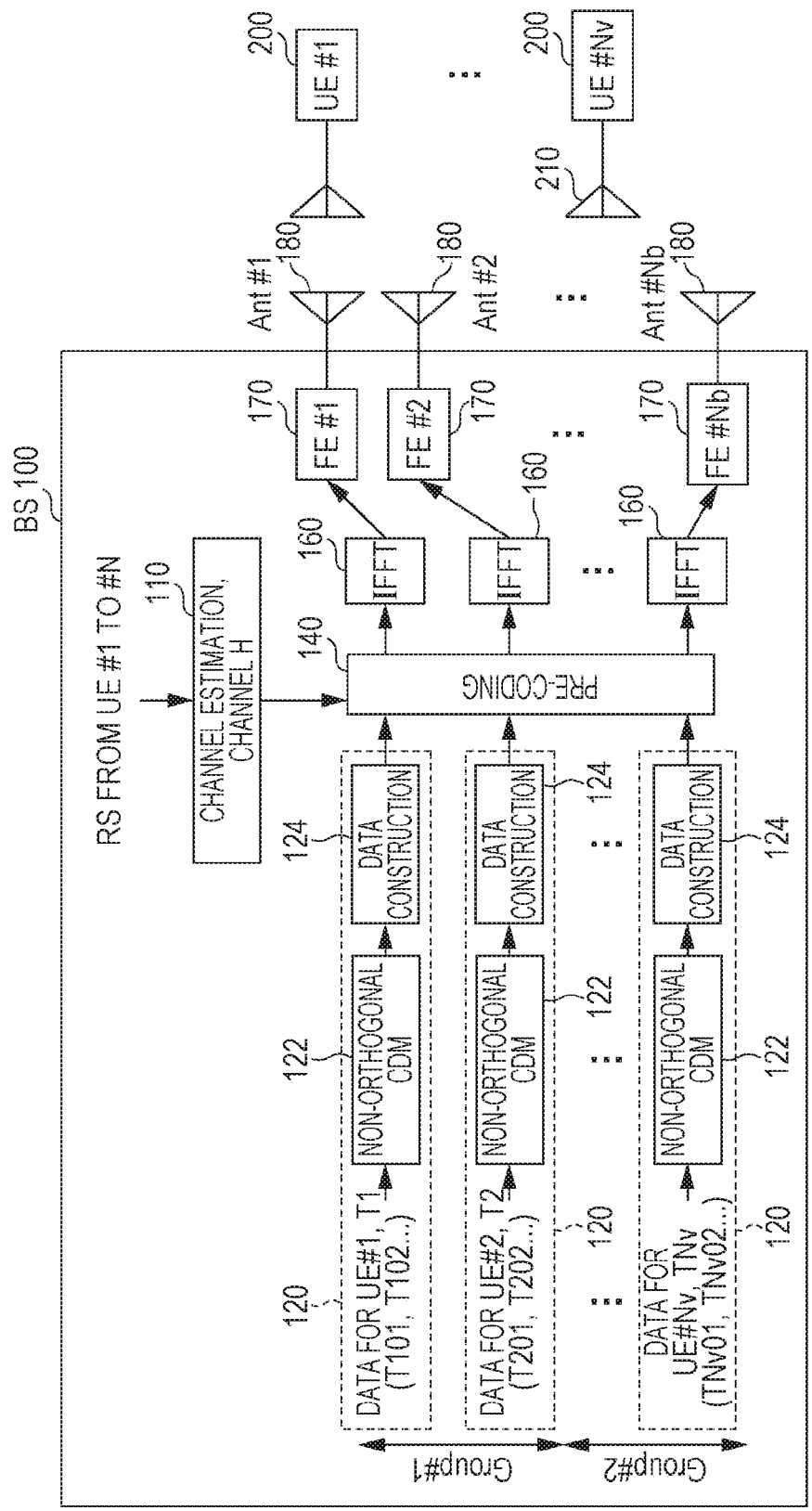
FIG. 1 is a diagram illustrating a configuration in one cell including one base station apparatus BS, and Nv terminals.

FIG. 1 illustrates a configuration in one cell which accommodates one base station BS (base station apparatus) 100 according to an embodiment of the present disclosure, and Nv terminal apparatuses (UE #1 to #Nv) 200. It is assumed that a communication method to be used is an OFDM method.

The BS 100 includes Nb pieces of transmission antennas (Ant #1 to Ant #Nb) 180, and front end (FE) sections (FE #1 to FE #Nb) 170 that are attached to these. The number Nb of antennas 180 is assumed to be about 100 pieces.

Each UE transmits a reference signal RS for channel estimation to the BS 100. The BS 100 receives these reference signals RS, and estimates all the channels between Nb pieces of the antennas 180 held by the BS 100 and each UE to obtain a channel matrix H.

Also, the BS 100 includes a transmission data processing section 120 for each one terminal (UE). The same number of transmission data processing sections 120 as the number of terminals are provided. The same number of below-described pairs of inverse fast Fourier transform (IFFT) sections 160 and FE sections 170 are provided as the number of the antennas 180.

The transmission data processing section 120 includes a multiplexing section (Non-Orthogonal CDM block) 122, and a data construction section (Data construction block) 124.

The BS 100 prepares data T1, T2, ... to be transmitted to each UE, and the multiplexing section (Non-Orthogonal CDM block) 122 performs multiplexing using orthogonal codes for each UE. Next, in the BS 100, the data construction section (Data construction block) 124 puts these signals together, and a pre-coding section (pre-coding block) 140 performs predetermined pre-coding processing described later. The pre-coding processing generates transmission data for each antenna 180. The transmission data for each antenna is subjected to conversion from frequency axis to time axis in an IFFT 160 for each antenna 180, and I-component and Q-component transmission data are obtained. The transmission data is subjected to base processing by the relevant FE section 170, such as insertion of guard intervals, parallel-serial conversion, further, digital/analog conversion, and the like. The I and the Q analog signal obtained in this manner are transmitted from the relevant antenna 180 to the plurality of UEs 200 through an orthogonal modulation section and a high frequency section.

Figure 2:
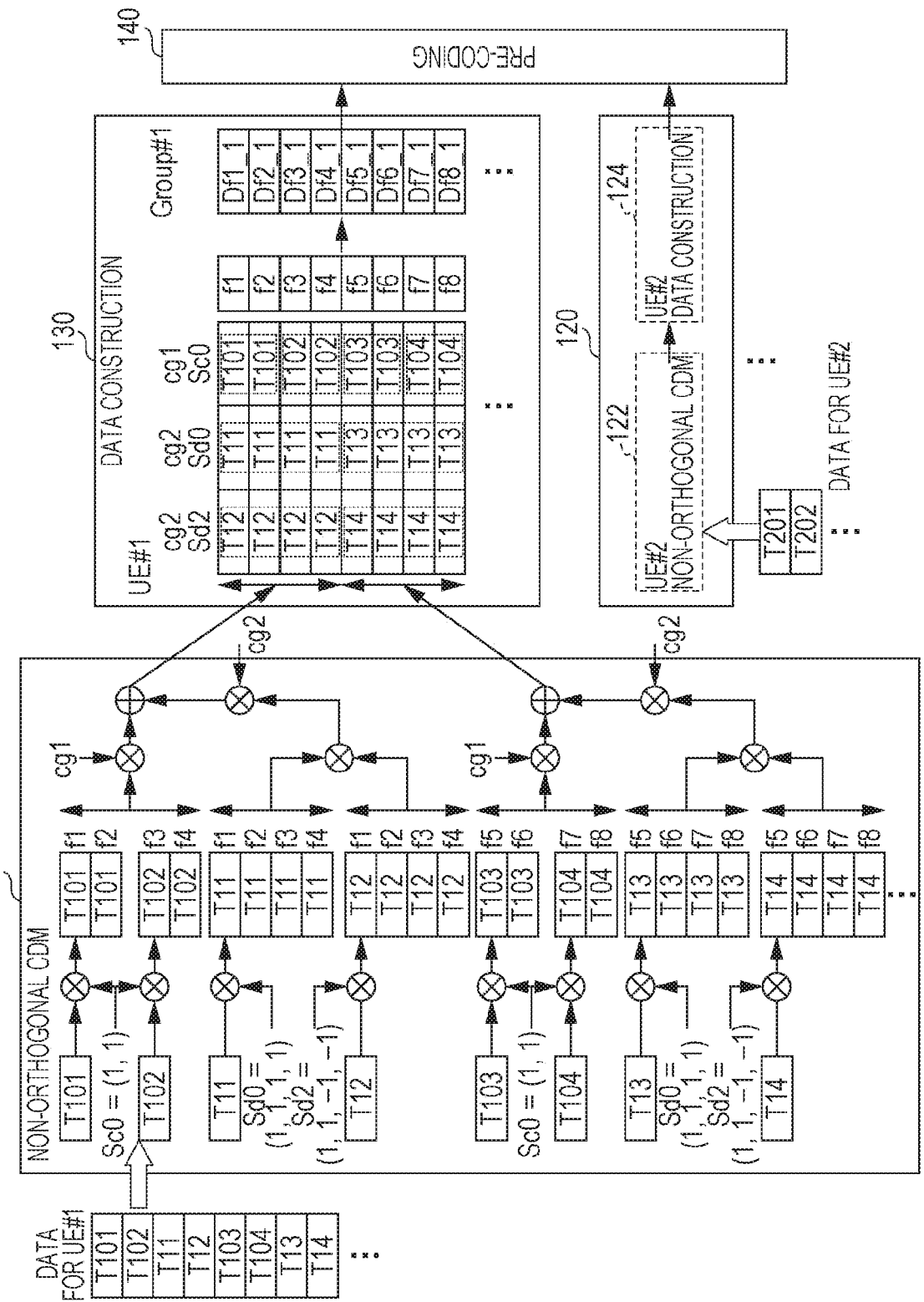
FIG. 2 is a block diagram for explaining a method of multiplexing using orthogonal codes of an embodiment of the present disclosure.

FIG. 2 is a block diagram for explaining a method of multiplexing using orthogonal codes of the embodiments of the present disclosure. Here, for details of use of orthogonal codes, refer to the description of the prior application U.S. Ser. No. 14/178,898.

The summary of code multiplexing (code multiplexing) in the present embodiment is as follows.

Data={D00(x)sc0+D01(x)sc0}·cg1+{D10(x)sd0+D11(x)sd1}·cg2

Here, Data represents data of the multiplexed result. D00 to D11 are data representing one symbol (QPSK: 2 bits, 8-PSK: 3 bits, and 16QAM: 4 bits). The term (x) represents multiplication (an inner product operation). The terms sc0, sd0, and sd1 represent orthogonal codes (Orthogonal codes). Here, sc0=(1, 1), sd0=(1, 1, 1, 1), and sd1=(1, 1, −1, −1). The terms cg1 and cg2 represent amplitude adjustment factors described later.

FIG. 2 illustrates the details of the transmission data processing section 120 for one unit of the UE in FIG. 1.

In this example, Nv terminals are divided into two groups Group #1, and #2. The method of the division was division into individual equal Nv/2 units. However, it is not necessary to divide equally.

In the following, a detailed description will be given of the case of Group #1. Here, a downlink data sequence for each terminal is denoted by TN. "N" represents the number N of a terminal, and "" represents a numeric value for identifying downlink data. For example, "1" in the down link data sequence T1** indicates the first number terminal.

First, a first symbol T101 in a down link data sequence T1** for the first terminal #1 disposed in Group #1 is spread with a spread code Sc0=(1, 1) having a length of 2 (that is to say, an inner product operation is applied) to obtain T101 of two symbols, and these are multiplied by an amplitude adjustment factor cg1.

Next, a second symbol T102 is spread with the spread code Sc0=(1, 1) in the same manner (that is to say, an inner product operation is applied) to obtain T102 of two symbols, and these are multiplied by the amplitude adjustment factor cg1.

Next, a third symbol T11 is spread with a spread code Sd0=(1, 1, 1, 1) having a length of 4 to obtain T11 of four symbols, and after that, these are multiplied by an amplitude adjustment factor cg2.

Next, a fourth symbol T12 is spread with a spread code Sd2=(1, 1, −1, −1) having a length of 4, and multiplied by cg2. In this manner, the two symbols of T101, and the two symbols of T102 are paired to obtain the four symbols, and the symbols of the individual four symbols of T11 and T12 are added with each other to produce data Df1_1 to Df4_1.

The multiplication of the amplitude adjustment factor cg2 may be performed either before or after the addition of the symbols with each other. In the example in FIG. 2, multiplication is performed on the addition result all together after the addition.

The operation as the above is performed for all transmission data in the individual terminals in Group #1.

For Group #2, as a spread code having a length of 2, Sc1=(1, −1), which has orthogonal relationships with Sc0=(1, 1) of Group #1, is used. Also, as spread codes having a length of 4, Sd1=(1, −1, 1, −1), and Sd3=(1, −1, −1, 1), which have orthogonal relationships with Sd0=(1, 1, 1, 1) of Group #1, are used. The same operation as described above is performed using these spread codes.

The amplitude adjustment factor cg is used for the purpose of eliminating interference caused by spreading data to the same terminal with the codes that are orthogonal to each other. When two codes having a length of 2 (Sc0) are disposed, it seemingly becomes a code having a length of 4, and more specifically, an orthogonal relationship with a long code (Sd*) is not guaranteed. Thus, in order to make the signal amplitude of a long code greater than the signal amplitude of a short code, the amplitude adjustment factor cg is used. By such amplitude adjustment, it is possible to reproduce, by inverse spreading, the original signal having been spread with the individual codes from the addition result of spread signals based on the non-orthogonal codes.

The method of determining a value of the amplitude adjustment factor cg is, for example, as follows.

[Expression 2]

$$\sum_{n=1}^{\log_2 K - 1} cg(2^n) \langle cg(2^{\log_2 K}) \quad (2\text{-}1) \text{ expression}$$

In the (2-1) expression, K is a length to the orthogonal code. For example, in the case of using a code having a maximum length 16, values of the individual amplitude adjustment factors are selected to meet the following expression:

$$cg1 + cg2 + cg4 + cg8 < cg16 \quad (2\text{-}2)$$

expression

Figure 10:
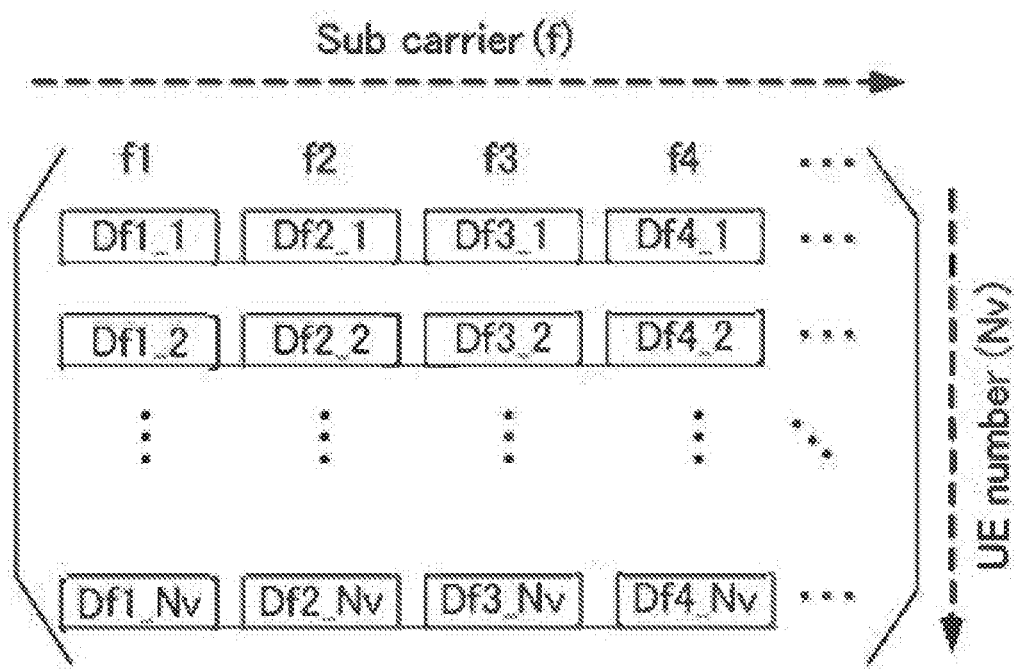
FIG. 10 illustrates a (3) expression of a data matrix DT.

In this manner, the data obtained by the multiplexing section 122 is divided into frequency direction components and terminals in the data construction sections 130 that are equal in number to the terminals (FIG. 1), and a data matrix DT having a structure of the (3) expression illustrated in FIG. 10.

Next, the pre-coding (Pre-Coding) section 140 performs the pre-coding processing as follows on the data matrix DT obtained by the above operation. The pre-coding processing using a pre-coding matrix PM according to the present disclosure is intended to prevent interference components from being multiplied by code lengths, and signal separation from becoming unable when transmission data is spread with orthogonal codes.

Figure 3:
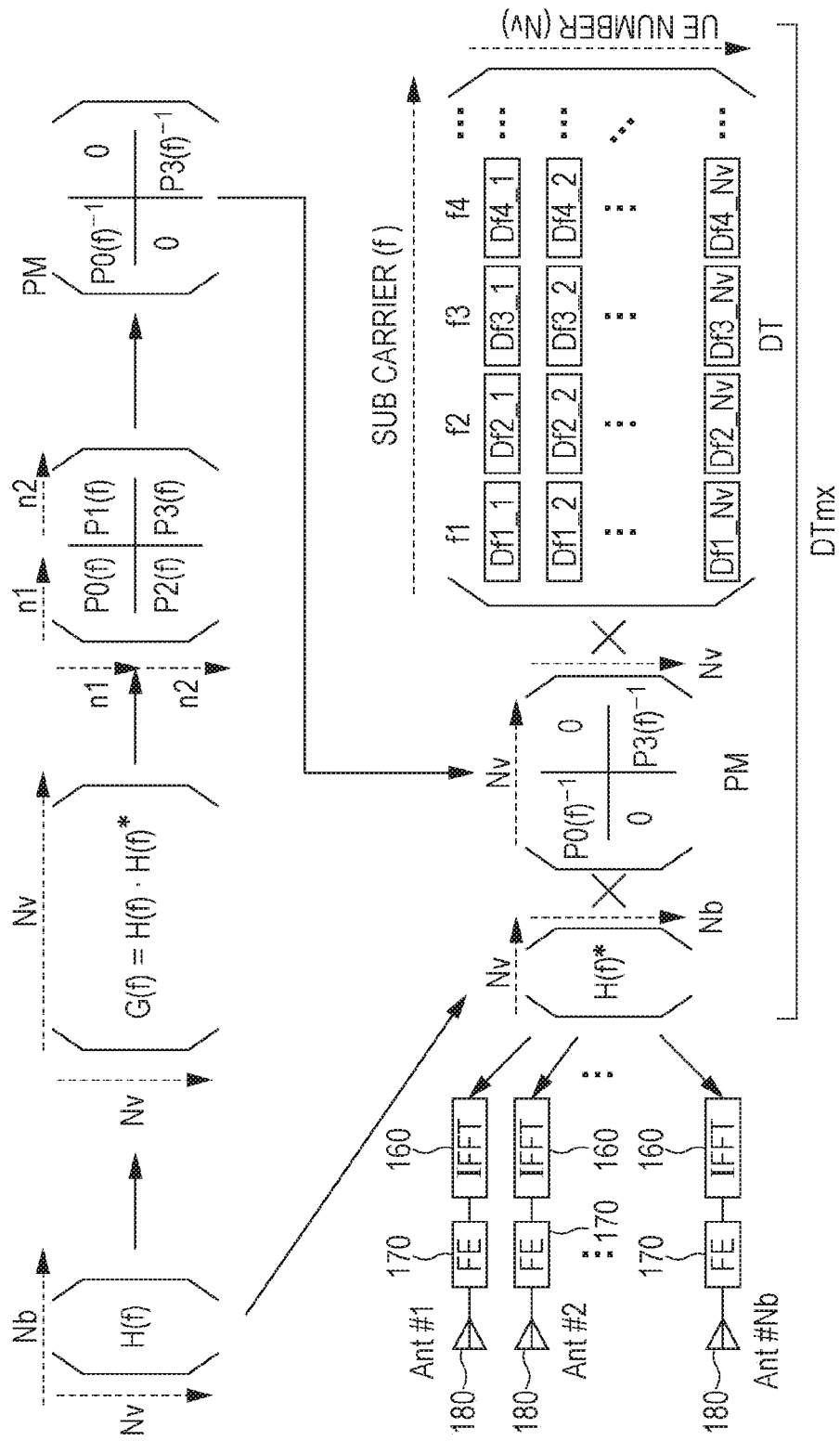

A description will be given of the pre-coding matrix PM, and the operation after that with reference to FIG. 3. On the premise of the pre-coding processing, first, the above-described channel estimation section 110 performs estimation of a channel matrix H(f). Here, "f" is a notation for indicating that in the case of handling OFDM, it is necessary to prepare for each frequency. The pre-coding matrix PM includes the channel values between all the antennas 180 of the BS, and all the UEs 200 as elements on the basis of the reference signal RS transmitted from each UE.

Next, the complex conjugate transpose H(f)* of H(f) is obtained, and the correlation matrix G(f) of the (4) expression is obtained by the matrix multiplication by H(f).

[Expression 4]

$$G(f) = H(f) \cdot H(f)^* \quad (4) \text{ expression}$$

This correlation matrix G(f) is an Nv×Nv square matrix. This matrix is divided into Group #1 and #2. Now, it is assumed that the number of UEs disposed in Groups #1 and #2 are n1 and n2 (Here, n1+n2=Nv), respectively. Also, it is assumed that the division of the correlation matrix G(f) is a block diagonal division having two square matrices as diagonal elements. That is to say, if it is assumed that the two diagonal elements are n1×n1 square matrix P0, and n2×n2 square matrix P3, the correlation matrix G(f) becomes as illustrated in (5) expression illustrated in FIG. 11.

Next, the pre-coding matrix PM as illustrated by (6) expression is made using the (5) expression. That is to say, this operation corresponds to changing P1(f) and P2(f) portions in (5) expression to zero, and changing P0(f) and P3(f) portions to the corresponding inverse matrices. The (6) expression is illustrated in FIG. 12.

The data matrix DT in the (3) expression, which has been composed before, is multiplied by the pre-coding matrix PM, and further, the complex conjugate transpose H(f)* of the channel matrix is multiplied. That is to say, the operation in the following (7) expression is performed to finally obtain a matrix DTmx.

[Expression 7]

$$DTmx = H(f)^* \cdot PM \cdot DT \quad (7) \text{ expression}$$

The matrix obtained by this expression, DTmx, is an Nb×1 (the number of BS antennas×1 row) row vector for a certain sub-carrier fc. This data is set to a frequency axis of the IFFT section 160 provided for each antenna 180. These are transmitted to all the terminals 200 (UE #1 to UE #Nv) by the FE sections 170 including the high-frequency blocks disposed at the individual antennas 180 in the same manner through the corresponding antennas 180.

Next, a description will be given of reception operation at each terminal.

FIG. 4 is a block diagram illustrating a configuration of major parts a terminal (UE) in the present embodiment. All the terminals have the same configuration.

The signal received by an antenna 210 of the terminal is converted into a baseband signal by an FE section 220, which is the well-established reception section. That is to say, the reception signal is demodulated by the high frequency section and the orthogonal demodulation section, and reception data including an I component and a Q component is obtained. The individual reception data of the I component and the Q component are converted into parallel data by serial-parallel conversion, and further converted into digital data by A/D conversion. After that, the guard intervals are removed. In this manner, the obtained baseband signal is subjected to FFT processing used in OFDM, and converted from a time domain to a frequency domain by a fast Fourier transform (FFT) section 230.

After that, a signal processing section 240 performs inverse spreading on the components of the sub-carriers f1 to f4 using the spread codes Sd0 and Sd2 if the terminal is disposed in Group #1. Thereby, it is possible to decode the data T11 and T12.

Next, cg2×T11, and cg2×T12 are obtained using cg2, and are individually spread again with the codes Sd0 and Sd2. Thereby, the sum of the both obtained spread results is subtracted from the signals received first. When the inverse spreading is performed on the subtraction result by the spread codes Sc0, it is possible to decode the data T101 and T102. At this time, the signals to the other terminals have arrived at the UE. Their formats are represented by the (8) expression illustrated in FIG. 13.

"I" in the (8) expression indicates an identity matrix.

The signals to Group #2 are spread with the codes that are orthogonal to Group #1 with each other, and thus the elements of the non-diagonal blocks P1·P3$^{-1}$ and P2·P0$^{-1}$ in the (8) expression become zero by the inverse spreading, and thus interference is suppressed.

Also, the signals in Group #1 are separated with each other by the identity matrices I that have been subjected to sub-diagonalization, and thus do not cause interference. The sub-diagonal matrix holds only for the terminals that compose a diagonal relationship with the channel matrix H(f) from the characteristic of the massive MIMO, and thus it is possible for each terminal to correctly receive the own signal.

In the present embodiment, data is spread with codes, and thus the amount of communication is reduced by a spread length. Thus, non-orthogonal multiplexing is performed as in the above example, but the modulation method of the data to be spread is adjusted so that it is possible to perform communication of a large amount of data per unit time. In this example, 16QAM is used for the data of the spread length of 2, that is to say, for the spread data T101, T102, TN01, and TN02 with Sc0, and Sc1 according to the embodiment, and 8PSK is used for the spread data with Sd0, Sd1, Sd2, and Sd3. Thereby, the number of transmission bits per one sub-carrier in OFDM becomes 3.5 bits, and thus it is possible to obtain a value which is near to 4.0 bits in the case of using 16QAM in the same manner in a related-art method. Also, the amplitude adjustment factors were determined such that cg1=0.5 for Sc0 and Sc1, and cg2=2.01 for Sd0 to Sd3.

Next, a description will be given of a method of adjusting the difference of the distances between the BS and a plurality of terminals. The terminals are assumed to be moving bodies, and thus the distances from the BS to the terminals are greatly different depending on the individual terminals. If the method of the present disclosure is applied without taking any measures, the distance information is reflected on the channel information. At the time of downlink transmission, a delay according to the distance information is included at a terminal side, and thus each terminal is subject to pseudo interference as a result. Accordingly, it is desirable to prevent this. In the present disclosure, terminals transmit reference signals to a base station. The base station measures the reception time difference between the terminals, and notifies the time difference of transmission time to each terminal. Each terminal adjusts the own transmission time (transmission timing) in accordance with this notification (that is to say, delays, or advances). Thereby, it is possible to synchronize reception signals from all the terminals at the base station. The permissible error in this distance measurement becomes the time difference corresponding to one bin in the case where the receiver is OFDM. For example, in the case of LTE having an OFDM size of 2048, the sub-carrier interval is 15 kHz, and thus the time corresponding to one bin becomes 32 ns. This is about 10 m.

A description will be given of advantages of a MIMO communication method of the present disclosure. With the method of the present disclosure, for the data corresponding to FIGS. 5A and 5B, even if the number Nv of terminals is increased, it is possible to obtain error-free results all the time. FIG. 6 illustrates a BER characteristic when noise is added with respect to the number Nb of antennas of the base station. When the number Nb of antennas increases, noise decreases by averaging as already described, and the BER improves as a result. The data in FIG. 6 illustrates the case where the noise is fixed at EbN0=6 dB. Here, EbN0 represents energy (Eb) per one-bit reception/noise power (N0) per one Hz. In FIG. 6, a related-art example is illustrated for comparison. Both in the related-art example, and the example of the method of the present disclosure, the state, in which if the number of antennas increases, the BER decreases, is observed. In this regard, in the related-art example, OFDM is used in which the number of terminals is four units, and 16QAM is used for the modulation method of data. In the present embodiment, the number of terminals is four units, the number of groups is two, the spread data with the code having a length of 2 uses 16QAM, and the spread data with a length of 4 uses 8PSK.

In the above, a description has been given of the case where the number of groups is two, but it is possible to expand to the cases where the number of groups is three or more. In the case where the number of groups is 3 or 4, the shortest code has a length of 4, and the orthogonal codes to be superimposed have a length of 4, 8, 16, . . . . In the case where the number of groups is 5, 6, 7, or 8, the shortest code length becomes 8, and the length of the codes to be superimposed have a length of 16, 32, 64, . . . . The code to be superimposed is determined by the communication speed that is necessary for transmission.

Figure 7:
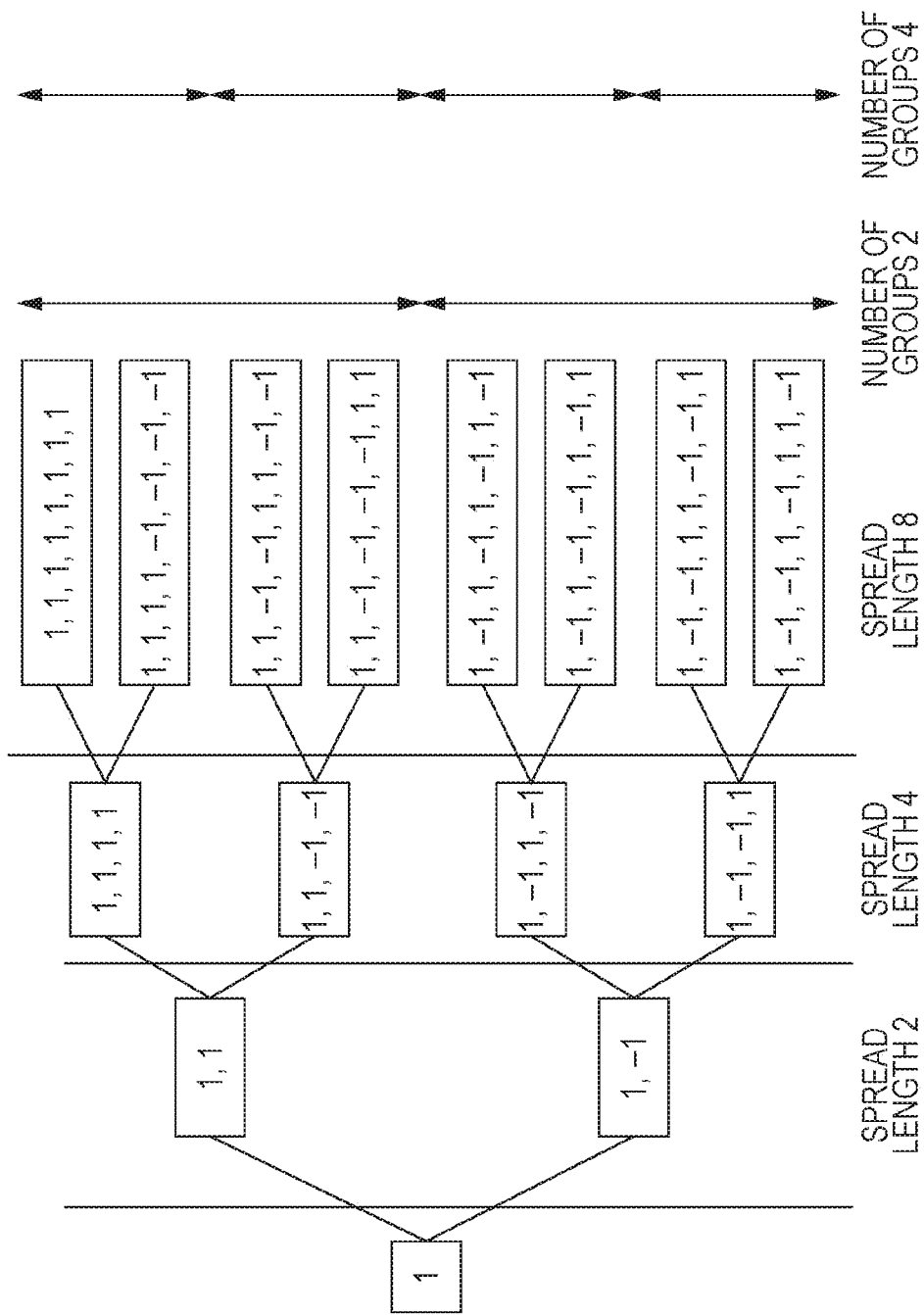
FIG. 7 is a diagram for explaining OVSF codes.
Figure 8:
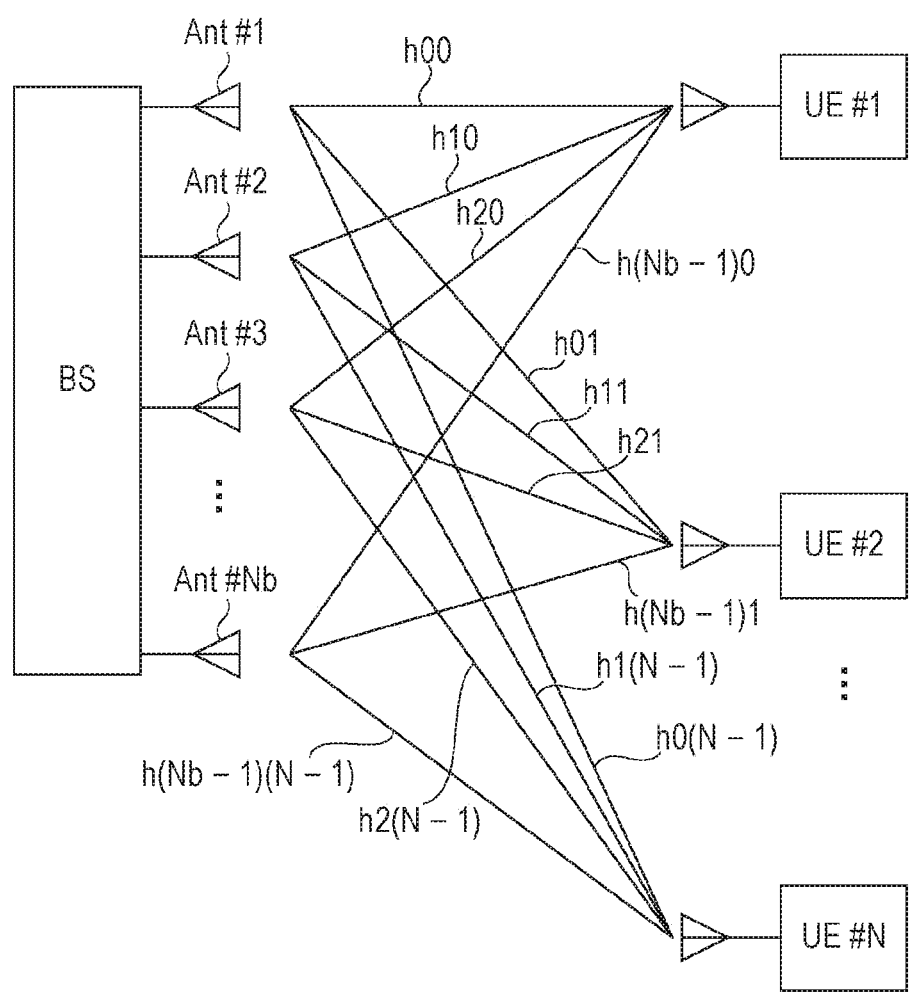
FIG. 8 is a diagram illustrating a schematic configuration of a communication system to which massive MIMO in the present disclosure is applied.

Here, a description will be given of assignment of the orthogonal codes. For the orthogonal codes, for example, it is possible to use an well-established code, such as OVSF code (Orthogonal Variable Spreading Factor: orthogonal variable spreading factor). FIG. 7 illustrates the structure of the OVSF codes. In the case of the number of groups2, the code group included in the individual codes of the spread length2 are applied to each group. In the case of the number of groups4, the codes included in each group of the spread length4 or more are applied.

With the present embodiment, it is possible to expect great advantages, that is to say, the restriction on the number of terminals allowed to be accommodated is relaxed, the high-order modulation of 16QAM can be applied, and it is possible to obtain advantages of diagonalization and noise reduction by auto-correlation, which are characteristics of massive MIMO, and to achieve an increase in the channel capacity.

With the present disclosure, the following method and apparatus are presented.

(1) A MIMO communication method for performing MIMO communication between a base station including a plurality of antennas, and a plurality of terminals accommodated in the base station, the method comprising:
in the base station,
dividing the plurality of terminals into a first and a second group, and assigning orthogonal codes with each other to the respective groups,
spreading transmission data to the plurality of terminals with the assigned codes,
multiplying data obtained by the spreading with a predetermined pre-coding matrix,
obtaining a channel matrix representing channels between the plurality of antennas and the plurality of terminals,
multiplying data obtained by the multiplying by the pre-coding matrix by a complex conjugate matrix of the channel matrix, and
transmitting data obtained by the multiplying by the complex conjugate matrix from the plurality of antennas,
in each of the plurality of terminals,
receiving signals transmitted from the plurality of antennas of the base station, and
inversely spreading the received signals using an orthogonal code assigned to the own terminal so as to decode transmission data to the own terminal.

(2) The MIMO communication method according to (1), wherein when a square matrix having the number of terminals in each group as an order is set to a submatrix in a diagonal part of an auto-correlation matrix of the channel matrix, the pre-coding matrix is a block diagonal matrix including the inverse matrices of the submatrices as diagonal parts, and non-diagonal parts set to zero.

(3) The MIMO communication method according to (1), wherein in the base station, in the assigning the orthogonal codes with each other to the first and the second group, assigning a same one pair of codes to terminals in the same group, as data for each of the terminals, preparing first data obtained by spreading with a code having a spread length of n (n: an integer of 2 or more) out of the same one pair of codes, and multiplying by a first amplitude adjustment factor, and second data obtained by spreading with a code having a spread length of 2·n, and multiplying by a second amplitude adjustment factor, multiplying a sum of the first and the second data with each other by the pre-coding matrix, and in each of the plurality of terminals, receiving the transmission data transmitted from the base station, inversely spreading the received signals with a longest code out of the orthogonal codes assigned to the own terminal to obtain the second data, and spreading the obtained second data with the code having the spread length of 2·n again, subtracting a multiplication result by the second amplitude adjustment factor from the first reception signal, and inversely spreading obtained data by a code having the spread length of n to obtain the first data.

(4) The MIMO communication method according to (1), wherein in the base station, in the assigning the orthogonal codes with each other to the first and the second group, assigning a same one pair of codes to terminals in the same group, as data for each of the terminals, preparing first data obtained by spreading with a code having a spread length of n (n: an integer of 2 or more) out of the same one pair of codes, and multiplying by a first amplitude adjustment factor, second data obtained by spreading with a code having a spread length of 2·n, and multiplying by a second amplitude adjustment factor, and third data obtained by spreading with a code having a spread length of 2·2·n, and multiplying by a third amplitude adjustment factor, multiplying a sum of the first to the third data with one another by the pre-coding matrix, and in each of the plurality of terminals, receiving the signal transmitted from the plurality of antennas of the base station, inversely spreading the reception signal with a longest code out of the orthogonal codes assigned to the own terminal to obtain the third data, spreading the obtained third data with the code having the spread length of 2·2·n again, subtracting a multiplication result by the third amplitude adjustment factor from the first reception signal, assigning the obtained data to subtraction reception data, inversely spreading the subtraction reception data by a code having the spread length of 2·n to obtain the second data, and spreading the obtained second data with the code having the spread length of 2·n again, subtracting a multiplication result by the second amplitude adjustment factor from the subtraction reception data, and inversely spreading obtained data with a code having the spread length of n to obtain the first data.

(5) The MIMO communication method according to (1), wherein in the assigning the orthogonal codes with each other to the first and the second group, assigning a same one pair of codes to terminals in the same group, as data for each of the terminals, preparing first data obtained by spreading with a code having a shortest spread length of $2^m \cdot n$ (m=0, n: an integer of 2 or more) out of the same one pair of codes, and multiplying by a first amplitude adjustment factor, second data obtained by spreading with a code having a spread length of $2^m \cdot n$ (m=1), and multiplying by a second amplitude adjustment factor, and third data obtained by spreading with a code having a spread length of $2^m \cdot n$ (m=2), and multiplying by a third amplitude adjustment factor, in the following, spreading with a code having a spread length $2^m \cdot n$ (m=3, . . . ), and multiplying by each (m+1)-th amplitude adjustment factor, multiplying a sum of the first to the (m+1)-th data with one another by the pre-coding matrix, and in each of the plurality of terminals, receiving the signal transmitted from the plurality of antennas of the base station, inversely spreading the received signals with a longest code out of the orthogonal codes assigned to the own terminal to obtain the (m+1)-th data, spreading the obtained the (m+1)-th data with the code having a longest spread length again, subtracting a multiplication result by the (m+1)-th amplitude adjustment factor from the first reception signal, assigning the obtained data to subtraction reception data, and inversely spreading the subtraction reception data with a code having a next longest spread length to obtain the m-th data, spreading the obtained m-th data with the code having the next longest spread length again, subtracting a multiplication result by the m-th amplitude adjustment factor from the subtraction reception data, and the obtained data is assigned to the other subtraction reception data, in the following, this procedure is repeated until reaching a code having a spread length of $2^m \cdot n$ (m=0) of a shortest spread length n.

(6) The MIMO communication method according to (5), wherein as a modulation method, for the data spread with a code having a shortest length out of the one pair of codes, M-QAM (M is a value of 4, 16, 64, 128, . . . ) is used, and for the data spread with codes having the next length, and all lengths after that, N-PSK (N is an integer of 1 or more) is used.

(7) The MIMO communication method according to (1), wherein the plurality of terminals are configured to transmit reference signals to the base station, the base station is configured to measure reception time differences between the plurality of terminals, gives a notification of the time differences of the transmission time to each of the terminals, and each of the terminals is configured to change transmission timing of the own transmission signal in accordance with the notification.

(8) A base station apparatus for performing MIMO communication with a plurality of terminals accommodated in a base station including a plurality of antennas, the base station apparatus comprising:

a plurality of data processing sections configured to perform processing of transmission data for the plurality of terminals, a channel estimation section configured to estimate channels, and to obtain channel matrices representing channels between the plurality of antennas and the plurality of terminals on the basis of reference signals received from the terminals, a pre-coding processing section configured to generate a corresponding number of pieces of transmission data to a number of the plurality of antennas on the basis of output data of the data processing section, and the channels obtained by the channel estimation section, a plurality of inverse fast Fourier transform sections configured to convert a frequency axis of output data of the pre-coding processing section into a time axis, and a plurality of front end sections configured to process output of the plurality of inverse fast Fourier transform sections, and to supply transmission signals to the plurality of antennas, wherein each of the plurality of data processing sections is configured to divide the plurality of terminals into a first and a second group, to assign orthogonal codes with each other to the respective groups, to perform spreading of the transmission data for the plurality of terminals with the assigned codes, and the pre-coding processing section is configured to multiply data obtained by the spreading by a predetermined pre-coding matrix, and to multiply the data by a complex conjugate matrix of the channel matrix.

(9) The base station apparatus according to (8), wherein in the assigning the orthogonal codes with each other to the first and the second group, a same one pair of codes is assigned to terminals in the same group, as data for each of the terminals, each of the plurality of data processing sections is configured to prepare first data obtained by spreading with a code having a spread length of n (n: an integer of 2 or more) out of the same one pair of codes, and to multiply by a first amplitude adjustment factor, second data obtained by spreading with a code having a spread length of 2·n, and third data obtained by spreading with a code having a spread length of 2·2·n, and multiplying by a third amplitude adjustment factor, and the pre-coding processing section is configured to multiply a sum of the first to the third data with one another by the pre-coding matrix.

(10) The terminal for performing MIMO communication with the base station apparatus according to (9), the terminal comprising:

a reception section configured to receive signals transmitted from a plurality of antennas of the base station; and a signal processing section configured to process the received signals, wherein the signal processing section is configured to
inversely spread the reception signals with a longest code out of the orthogonal codes assigned to the own terminal to obtain the third data, spread the obtained third data with the code having the spread length of 2·2·n again, subtract a multiplication result by the third amplitude adjustment factor from the first reception signal, assign the obtained data to subtraction reception data, inversely spread the subtraction reception data with a code having the spread length of 2·n to obtain the second data, and spread the obtained second data with the code having the spread length of 2·n again, to subtract a multiplication result by the second amplitude adjustment factor from the subtraction reception data, and to inversely spread obtained data by a code having the spread length of n to obtain the first data.

In the above, descriptions have been given of the preferred embodiments of the present disclosure. However, it is possible to make various alterations and changes in addition to the above descriptions. That is to say, it is understood by those skilled in the art that various alterations, combinations, and the other embodiments may occur depending on design requirements or the other factors as long as they are within the scope of the appended claim or the equivalents thereof as a matter of course.

REFERENCE SIGNS LIST

100 . . . base station (BS) 120 . . . transmission data processing section 122 . . . multiplexing section 130 . . . data construction section 140 . . . pre-coding (Pre-Coding) section 160 . . . inverse fast Fourier transform (IFFT) section 170 . . . front end (FE) section 180 . . . antenna 200 . . . terminal 210 . . . antenna 220 . . . front end (FE) section (reception section) 230 . . . fast Fourier transform (FFT) section 240 . . . signal processing section cg1, cg2 . . . amplitude adjustment factors DT . . . data matrix DTmx . . . matrix f1, fc . . . sub-carriers G . . . correlation matrix H . . . channel matrix H* . . . complex conjugate transpose of channel matrix I . . . identity matrix Nb . . . the number of antennas Nv . . . the number of terminals P0 . . . square matrix P3 . . . square matrix PM . . . pre-coding matrix RS . . . reference signal Sc0, Sc1, Sd0-Sd3 . . . spread codes SIR . . . interference T1** . . . down link data sequence T11, T12, T101, T102 . . . symbols (data).

What is claimed is:

1. A multiple input multiple output (MIMO) communication method by a base station including a plurality of antennas and for MIMO communication with a plurality of terminals, the method comprising:

dividing, by the base station, the plurality of terminals into a first group and a second group, and assigning a plurality of orthogonal variable spreading factor (OVSF) codes to each of the first group and the second group;

multiplying a sum of at least a first data and a second data with each other by a pre-coding matrix to generate modified data, obtaining, by the base station, a channel matrix representing channels between the plurality of antennas and the plurality of terminals, and transmitting, from the plurality of antennas to the plurality of terminals according to the assigned OVSF codes, data having been obtained by the base station by multiplying the modified data by a complex conjugate transpose matrix of the channel matrix, wherein a terminal of the plurality of terminals receives the data transmitted from the base station, inversely spreads received signals with a longest code out of the OVSF codes assigned to the terminal to obtain the second data, spreads the second data with an OVSF code having a second length, subtracts a multiplication result by a second amplitude adjustment factor from a first reception signal, and inversely spreads obtained data by an OVSF code having a first length to obtain the first data.

2. The MIMO communication method according to claim 1, wherein in a case that a square matrix having a number of terminals in each group as an order is set to a submatrix in a diagonal part of an auto-correlation matrix of the channel matrix, the pre-coding matrix is set as a block diagonal matrix including inverse matrices of the submatrices as diagonal parts, and non-diagonal parts are set to zero.

3. The MIMO communication method according to claim 1, further comprising, in response to, the plurality of terminals transmitting reference signals to the base station,
measuring, by the base station, reception time differences between the reference signals of the plurality of terminals, and
providing a notification of time differences of a respective transmission time to each of the terminals, wherein
each of the terminals is configured to change a transmission timing of a corresponding transmission signal in accordance with the notification.

4. A base station, for multiple input multiple output (MIMO) communication with a plurality of terminals, the base station comprising:
a plurality of antennas; and
processing circuitry configured to:
divide the plurality of terminals into a first group and a second group;
assign a plurality of orthogonal variable spreading factor (OVSF) codes to each of the first group and the second group;
multiply a sum of at least a first data and a second data by a pre-coding matrix to generate modified data;
obtain a channel matrix representing channels between the plurality of antennas and the plurality of terminals; and
control the plurality of antennas to transmit, according to the assigned OVSF codes, data having been obtained by multiplying the modified data by a complex conjugate transpose matrix of the channel matrix, wherein
a terminal of the plurality of terminals receives the data transmitted from the base station, inversely spreads received signals with a longest code out of the OVSF codes assigned to the terminal to obtain the second data, spreads the second data with an OVSF code having a second length, subtracts a multiplication result by a second amplitude adjustment factor from a first reception signal, and inversely spreads obtained data by an OVSF code having a first length to obtain the first data.

5. The base station according to claim 4, wherein in a case that a square matrix having a number of terminals in each group as an order, is set to a submatrix in a diagonal part of an auto-correlation matrix of the channel matrix, the pre-coding matrix is set as a block diagonal matrix including inverse matrices of the submatrices as diagonal parts, and non-diagonal parts are set to zero.

6. The base station according to claim 4, wherein
the processing circuitry is further configured to, in response to the plurality of terminals transmitting reference signals to the base station,
measure reception time differences between the reference signals of the plurality of terminals, and
control the plurality of antennas to transmit a notification of time differences of a respective transmission time to each of the terminals, and
each of the terminals is configured to change a transmission timing of corresponding transmission signal in accordance with the notification.

7. The MIMO communication method according to claim 1, wherein the dividing further includes dividing the plurality of terminals into the first group, the second group, a third group and a fourth group.

8. The MIMO communication method according to claim 7, wherein the assigning includes assigning OVSF codes to each of the third group and the fourth group.

9. The MIMO communication method according to claim 8, wherein a shortest code of the OVSF codes has a length of 4.

10. The base station according to claim 4, wherein the processing circuitry is further configured to divide the plurality of terminals into the first group, the second group, a third group and a fourth group.

11. The base station according to claim 10, wherein the processing circuitry is further configured to assign OVSF codes to each of the third group and the fourth group.

12. The base station according to claim 11, wherein a shortest code of the OVSF codes has a length of 4.

* * * * *